United States Patent
Adachi

(10) Patent No.: US 10,045,317 B2
(45) Date of Patent: *Aug. 7, 2018

(54) USER TERMINAL AND BASE STATION

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,956

(22) Filed: Jan. 26, 2017

(65) Prior Publication Data

US 2017/0142673 A1    May 18, 2017

Related U.S. Application Data

(63) Continuation of application No. 15/049,905, filed on Feb. 22, 2016, now Pat. No. 9,578,614, which is a
(Continued)

(51) Int. Cl.
*H04W 56/00* (2009.01)
*H04W 76/14* (2018.01)
(Continued)

(52) U.S. Cl.
CPC ........ *H04W 56/001* (2013.01); *H04B 17/318* (2015.01); *H04W 8/005* (2013.01); *H04W 48/00* (2013.01); *H04W 56/00* (2013.01); *H04W 56/0015* (2013.01); *H04W 72/005* (2013.01); *H04W 76/02* (2013.01);
(Continued)

(58) Field of Classification Search
CPC . H04W 76/02; H04W 76/023; H04W 76/021; H04W 8/005; H04W 56/001; H04W 72/005
See application file for complete search history.

(56) References Cited

U.S. PATENT DOCUMENTS

2013/0150051 A1    6/2013   Van Phan et al.
2013/0273907 A1    10/2013  Vikberg et al.
(Continued)

OTHER PUBLICATIONS

Nokia, NSN; Discussion on D2D synchronization procedure for communication and discovery; 3GPP TSG-RAN WG1 Meeting #76bis; R1-141542; Mar. 31-Apr. 4, 2014; 6pp.; Shenzhen, China.
(Continued)

*Primary Examiner* — Redentor Pasia
(74) *Attorney, Agent, or Firm* — Studebaker & Brackett PC

(57) ABSTRACT

A user terminal includes processor configured to execute processes of: receiving, from a base station, configuration information indicating whether the user terminal shall transmit a device-to-device (D2D) synchronization signal used for a D2D proximity service; transmitting the D2D synchronization signal in response to the received configuration information being first configuration information explicitly indicating the user terminal shall transmit the D2D synchronization signal; and prohibiting transmission of the D2D synchronization signal in response to the received configuration information being second configuration information explicitly indicating the user terminal shall not transmit the D2D synchronization signal.

3 Claims, 8 Drawing Sheets

Related U.S. Application Data continuation of application No. PCT/JP2015/063262, filed on May 8, 2015.

(60) Provisional application No. 61/990,951, filed on May 9, 2014.

(51) Int. Cl.
| | |
|---|---|
| *H04W 76/11* | (2018.01) |
| *H04W 76/10* | (2018.01) |
| *H04B 17/318* | (2015.01) |
| *H04W 48/00* | (2009.01) |
| *H04W 8/00* | (2009.01) |
| *H04W 72/00* | (2009.01) |
| *H04W 48/02* | (2009.01) |
| *H04W 48/16* | (2009.01) |
| *H04W 88/02* | (2009.01) |
| *H04W 88/08* | (2009.01) |
| *H04W 92/18* | (2009.01) |
| *H04W 76/02* | (2009.01) |

(52) U.S. Cl.
CPC ....... *H04W 76/021* (2013.01); *H04W 76/023* (2013.01); *H04W 76/10* (2018.02); *H04W 76/11* (2018.02); *H04W 76/14* (2018.02); *H04W 48/02* (2013.01); *H04W 48/16* (2013.01); *H04W 88/02* (2013.01); *H04W 88/08* (2013.01); *H04W 92/18* (2013.01)

(56) References Cited

U.S. PATENT DOCUMENTS

| | | | |
|---|---|---|---|
| 2014/0160950 A1 | 6/2014 | Vasudevan et al. | |
| 2014/0220895 A1 | 8/2014 | Wei et al. | |
| 2014/0314057 A1 | 10/2014 | Van Phan et al. | |
| 2014/0328329 A1 | 11/2014 | Novlan et al. | |
| 2015/0056982 A1* | 2/2015 | Sorrentino ............ | H04W 60/00 455/426.1 |
| 2015/0071256 A1* | 3/2015 | Hwang ............... | H04W 76/023 370/336 |
| 2015/0117375 A1 | 4/2015 | Sartori et al. | |
| 2015/0271841 A1 | 9/2015 | Yamada et al. | |
| 2015/0271846 A1 | 9/2015 | Kowalski et al. | |
| 2015/0271861 A1 | 9/2015 | Li et al. | |
| 2016/0037385 A1* | 2/2016 | Boudreau ............. | H04W 28/18 370/328 |
| 2016/0249311 A1* | 8/2016 | Yu ........................ | H04W 4/005 |

OTHER PUBLICATIONS

Alcatel-Lucent Shanghai Bell, Alcatel-Lucent; Considerations on D2D synchronization signal design; 3GPP TSG-RAN WG1 Meeting #76bis; R1-141260; Mar. 31-Apr. 4, 2014; 4pp.; Shenzhen, China.

Catt; Discussion on D2D synchronization procedure; 3GPP TSG-RAN WG1 Meeting #76bis; R1-141198; Mar. 31-Apr. 4, 2014; 7pp.; Shenzhen, China.

An Office Action issued by the Japanese Patent Office dated Jun. 13, 2017, which corresponds to Japanese Patent Application No. 2017-092578 and is related to U.S. Appl. No. 15/416,956; with English language concise explanation.

International Search Report; issued in PCT/JP2015/063262; dated Jul. 14, 2015.

Written Opinion; issued in PCT/JP2015/063262; dated Jul. 14, 2015.

3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.

Catt; Discussion on inter-cell coordination for D2D; R3-140066; 3GPP TSG-RAN WG3 #83; Feb. 10-14, 2014; pp. 1-4; Prague, Czech Republic.

NTT Docomo, Inc.; Resource allocation for inter-cell D2D discovery; 3GPP TSG-RAN WG1 Meeting #74bis; R1-134503; Oct. 7-11, 2013; pp. 1-2; Guangzhou, China.

Nokia, NSN; On D2D synchronization design; 3GPP TSG-RAN WG1 Meeting #76; R1-140571; Feb. 10-14, 2014; pp. 1-6; Prague, Czech Republic.

Ericsson; Synchronization Procedures for D2D Discovery and Communication; 3GPP TSG RAN WG1 Meeting #76bis; R1-141381; Mar. 31-Apr. 4, 2014: pp. 1-5: Shenzhen, China.

Sony; Remaining issues in D2D synchronization; 3GPP TSG RAN WG1 #76; R1-140588; Feb. 10-14, 2014: pp. 1-3; Prague, Czech Republic.

Nokia, NSN; D2D Synchronization—Out of network coverage/ partial network coverage; 3GPP TSG-RAN WG1 Meeting #74; R1-133496; Aug. 19-23, 2013; pp. 1-4; Barcelona. Spain.

An Office Action; "Notice of Reasons for Rejection," issued by the Japanese Patent Office dated Dec. 27, 2016, which corresponds to Japanese Patent Application No. 2016-517933 and is related to U.S. Appl. No. 15/049,905.

Ericsson; Inter-Carrier and Inter-Cell Aspects of D2D Discovery and Communication; 3GPP TSG RAN WG1 Meeting #76bis; R1-141386; Mar. 31-Apr. 4, 2014; pp. 1-5 ; Shenzhen, China.

ZTE; Synchronization for D2D Discovery; 3GPP TSG RAN WG1 Meeting #76bis; R1-141432; Mar. 31-Apr. 4, 2014; pp. 1-4; Shenzhen, China.

QUALCOMM Incorporated; Inter-cell D2D Discovery; 3GPP TSG-RAN WG2 #85 Bis; R2-141671; Mar. 31-Apr. 1, 2014; pp. 1-2; Valencia, Spain.

* cited by examiner

10,045,317 B2

USER TERMINAL AND BASE STATION

CROSS REFERENCE TO RELATED APPLICATION

This application is a Continuation Application of U.S. patent application Ser. No. 15/049,905 filed Feb. 22, 2016, which is a Continuation Application of International Application No. PCT/JP2015/063262, filed May 8, 2015, which claims benefit of U.S. Provisional Application 61/990,951 filed May 9, 2014, the entire contents of which are incorporated herein by reference.

TECHNICAL FIELD

The present disclosure relates to a user terminal and a base station which are used in a mobile communication system.

BACKGROUND ART

In 3GPP (3rd Generation Partnership Project) which is a project aiming to standardize a mobile communication system, the introduction of a Device-to-Device (D2D) proximity service is discussed as a new function on and after Release 12 (see Non Patent Document 1).

The D2D proximity service (D2D ProSe) is a service enabling direct device-to-device communication within a synchronization cluster including a plurality of synchronized user terminals. The D2D proximity service includes a discovery procedure (Discovery) in which a proximal terminal is discovered and D2D communication (Communication) that is direct device-to-device communication.

Further, a discovery procedure in which a user terminal that exists in a certain cell (serving cell) discovers a proximal terminal that exists in other cell (neighbor cell) is called an inter-cell discovery procedure (Inter-Cell Discovery). Further, D2D communication in which a user terminal that exists in a serving cell performs communication with a proximal terminal that exists in a neighbor cell is called an inter-cell D2D communication (Inter-Cell Communication).

Prior Art Documents

[Non Patent Document]

[Non Patent Document 1] 3GPP technical report "TR 36.843 V12.0.1" March, 2014

SUMMARY

A first user terminal comprises: a processor and a memory storing instructions executable by the processor to execute processes of: transmitting, from the first user terminal, first device-to-device (D2D) synchronization information including an identifier; receiving second D2D synchronization information transmitted from a second user terminal; measuring a received signal power corresponding to the second user terminal; determining, based on information included in the second D2D synchronization information, whether the second user terminal is in coverage of a predetermined cell; and synchronizing with the second user terminal and stopping transmission of the first D2D synchronization information including the identifier, in response to the received signal power exceeding a predetermined power value and the second user terminal being in the coverage.

A device equipped in a first user terminal comprises: a processor and a memory storing instructions executable by the processor to execute processes of: transmitting, from the first user terminal, first device-to-device (D2D) synchronization information including an identifier; receiving second D2D synchronization information transmitted from a second user terminal; measuring a received signal power corresponding to the second user terminal; determining, based on information included in the second D2D synchronization information, whether the second user terminal is in coverage of a predetermined cell; and synchronizing with the second user terminal and stopping transmission of the first D2D synchronization information including the identifier, in response to the received signal power exceeding a predetermined power value and the second user terminal being in the coverage.

A method performed at a first user terminal comprises: transmitting, from the first user terminal, first device-to-device (D2D) synchronization information including an identifier; receiving second D2D synchronization information transmitted from a second user terminal; measuring a received signal power corresponding to the second user terminal; determining, based on information included in the second D2D synchronization information, whether the second user terminal is in coverage of a predetermined cell; and synchronizing with the second user terminal and stopping transmission of the first D2D synchronization information including the identifier, in response to the received signal power exceeding a predetermined power value and the second user terminal being in the coverage.

DESCRIPTION OF EMBODIMENTS

[Overview of Embodiment]

Figure 1:
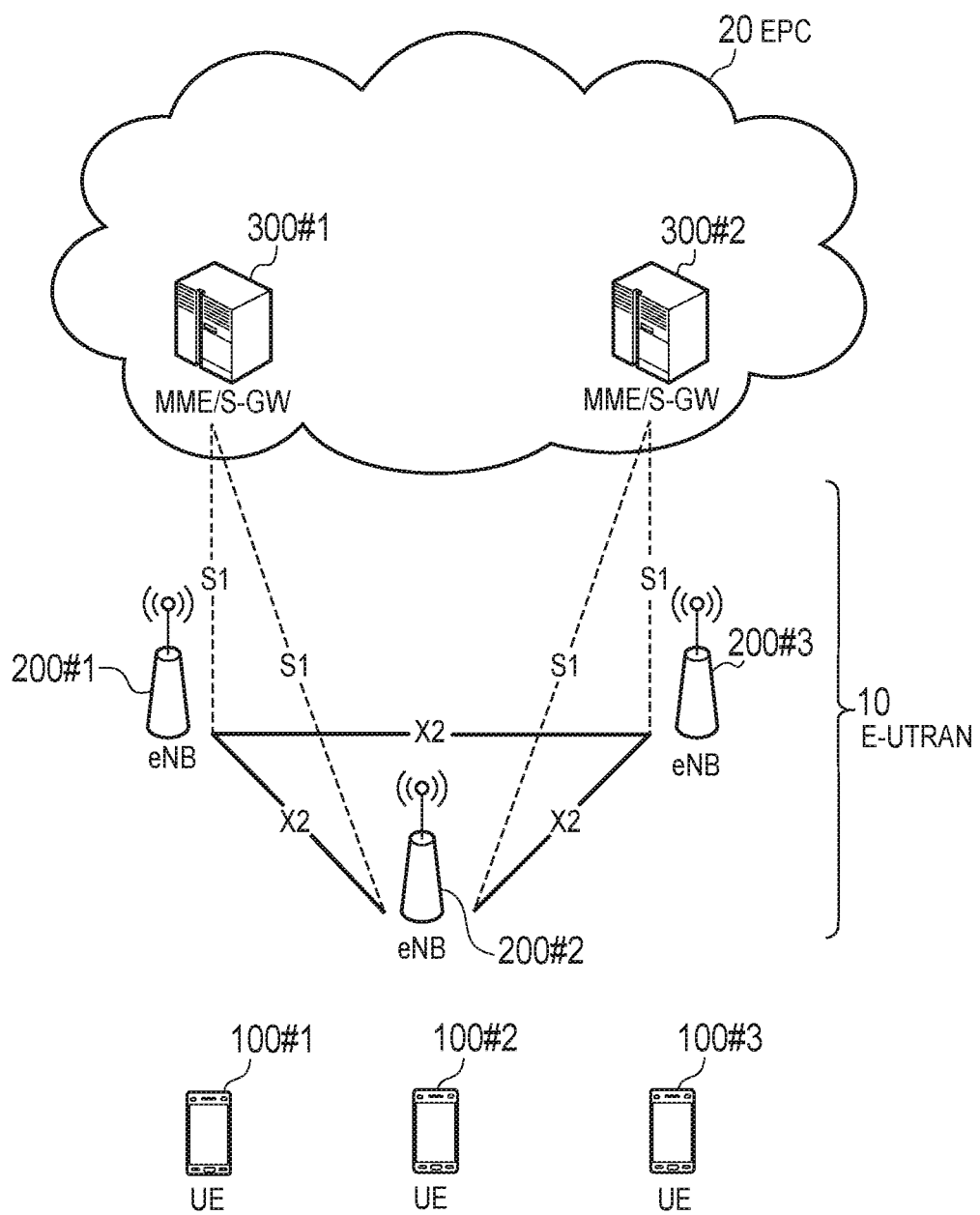
FIG. 1 is a configuration diagram of an LTE system according to a first embodiment and a second embodiment.

A user terminal according to a first embodiment is a user terminal that exists in a serving cell, in a mobile communication system that supports a D2D proximity service. The user terminal includes: a receiver configured to receive inter-cell synchronization information on whether a neighbor cell is synchronized with the serving cell, from a base station that forms the serving cell; and a controller configured to determine on the basis of the inter-cell synchronization information, before performing an Inter-Cell Discovery with a proximal terminal that exists in the neighbor cell or Inter-Cell D2D communication with the proximal terminal, whether to perform an inter-cell synchronization procedure for establishing synchronization with the proximal terminal.

In an operation pattern 1 according to the first embodiment, in the inter-cell synchronization procedure, the controller controls so that a D2D synchronization signal is transmitted in the serving cell.

In an operation pattern 2 according to the first embodiment, the inter-cell synchronization information includes information indicating a synchronization deviation amount between the serving cell and the neighbor cell.

In the operation pattern 2 according to the first embodiment, in the inter-cell synchronization procedure, the controller controls to be synchronized with the neighbor cell in accordance with the synchronization deviation amount.

A user terminal according to a second embodiment is a user terminal that exists in a serving cell, in a mobile communication system that supports a D2D proximity service. The user terminal includes: a transmitter configured to transmit a D2D synchronization signal for establishing, before performing an Inter-Cell Discovery with a proximal terminal that exists in a neighbor cell or Inter-Cell Communication with the proximal terminal, synchronization with the proximal terminal; and a controller configured to control to cancel transmission of the D2D synchronization signal from the transmitter, on the basis of detection of the D2D synchronization signal transmitted from another user terminal that exists in the serving cell.

In the second embodiment, when the controller detects a D2D synchronization signal transmitted from another user terminal that exists in the serving cell and a reception level of the detected D2D synchronization signal exceeds a threshold value, the controller controls to cancel the transmission of the D2D synchronization signal from the transmitter.

A base station according to a modification of the second embodiment is a base station that forms a serving cell in which a user terminal exists, in a mobile communication system that supports a D2D proximity service. The base station includes: a receiver configured to receive an inquiry as to whether it is possible to transmit a D2D synchronization signal for establishing synchronization with a proximal terminal, from the user terminal; and a controller configured to determine, on the basis of whether another user terminal that exists in the serving cell is permitted to transmit the D2D synchronization signal, whether to permit transmission, by the user terminal, of the D2D synchronization signal.

In a modification of the second embodiment, when the controller permits the other user terminal to transmit the D2D synchronization signal and it is estimated that there is the other user terminal near the user terminal, the controller determines that the transmission, by the user terminal, of the D2D synchronization signal is not permitted.

[First Embodiment]

A case where the present disclosure is applied to an LTE system that is a mobile communication system based on 3GPP standards will be described, below.

(1) System Configuration

First of all, the configuration of an LTE system according to a first embodiment will be described. FIG. 1 is a configuration diagram of the LTE system according to the first embodiment.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell). The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
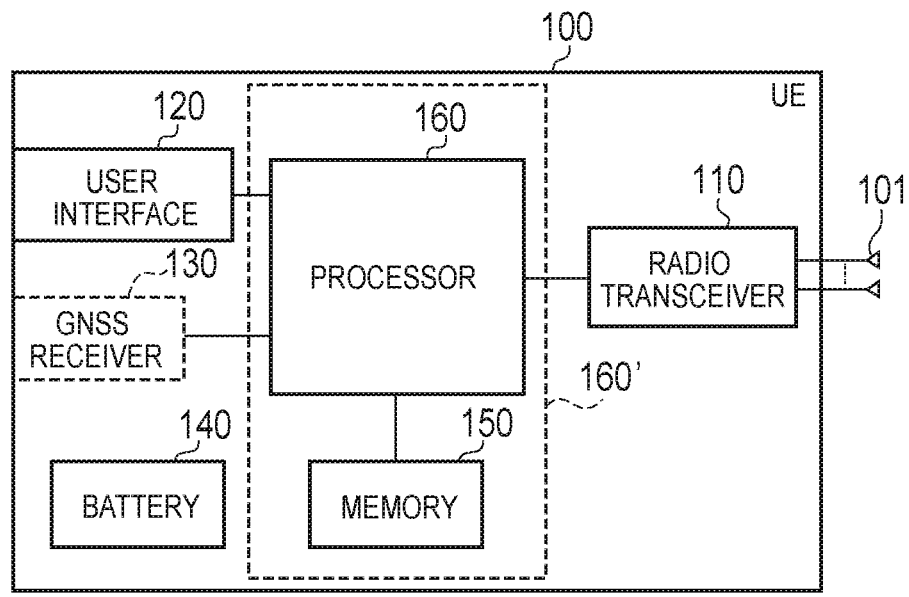
FIG. 2 is a block diagram of a UE according to the first embodiment and the second embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
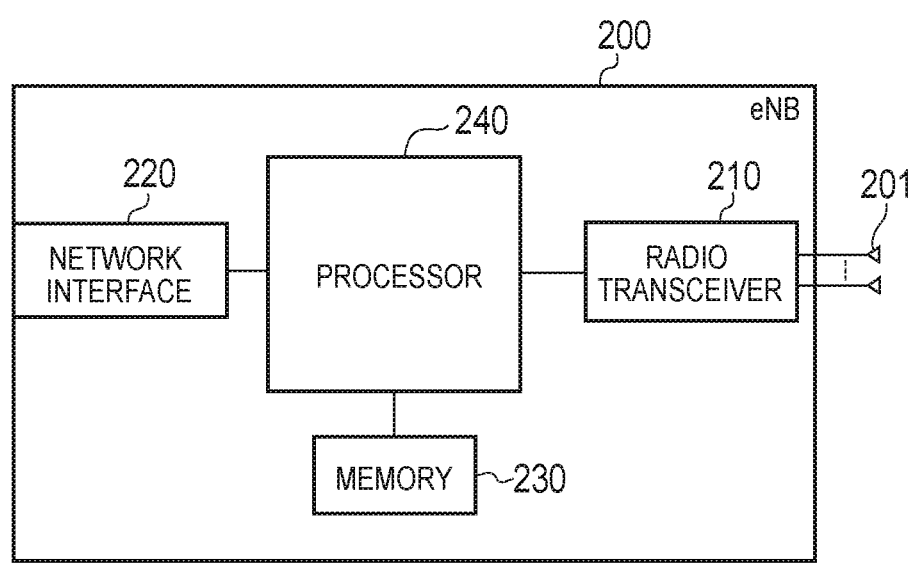
FIG. 3 is a block diagram of an eNB according to the first embodiment and the second embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 configure a controller. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
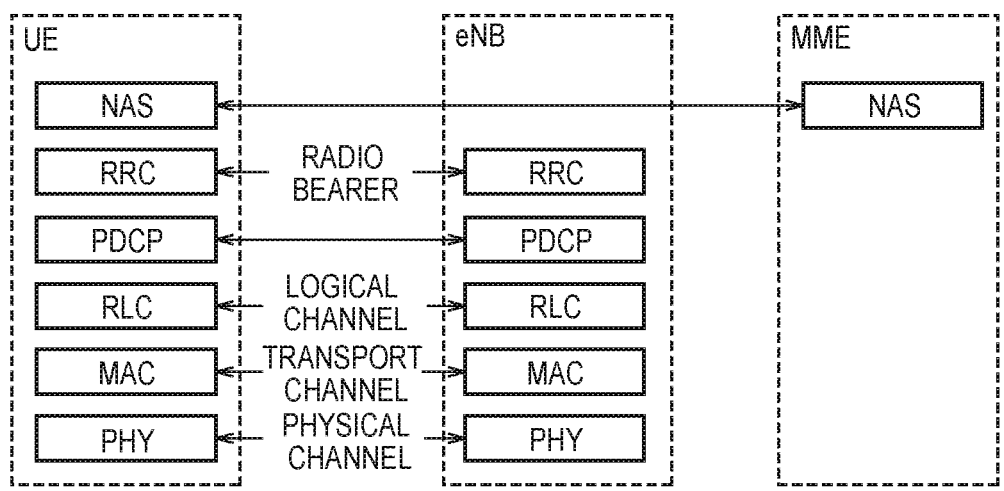
FIG. 4 is a protocol stack diagram of a radio interface according to the first embodiment and the second embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
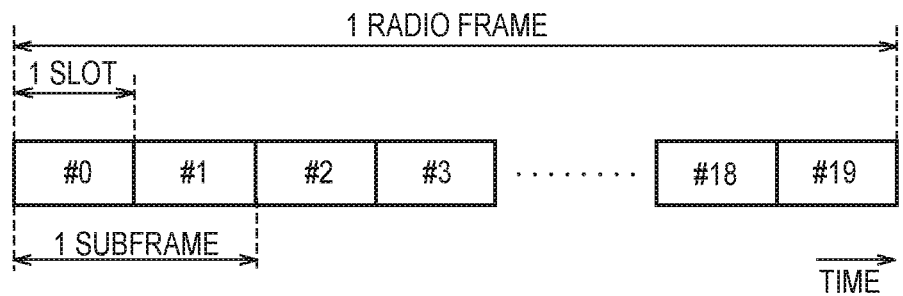
FIG. 5 is a configuration diagram of a radio frame used in the LTE system according to the first embodiment and the second embodiment.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. One symbol and one subcarrier form a one resource element. Of the radio resources (time and frequency resources) assigned to the UE 100, a frequency resource can be identified by a resource block and a time resource can be identified by a subframe (or a slot).

(2) D2D Proximity Service

A D2D proximity service will be described, below. An LTE system according to the first embodiment supports the D2D proximity service.

The D2D proximity service (D2D ProSe) is a service enabling direct UE-to-UE communication within a synchronization cluster including a plurality of synchronized UEs 100. The D2D proximity service includes a discovery procedure (Discovery) in which a proximal UE is discovered and D2D communication (Communication) that is direct UE-to-UE communication. The D2D communication is also called Direct communication.

A scenario in which all the UEs 100 forming the synchronization cluster are located inside a cell coverage is called "In coverage". A scenario in which all the UEs 100 forming the synchronization cluster are located outside a cell coverage is called "Out of coverage". A scenario in which some UEs 100 in the synchronization cluster are located inside a cell coverage and the remaining UEs 100 are located outside the cell coverage is called "Partial coverage".

In "In coverage", the eNB 200 is a D2D synchronization source. A D2D non-synchronization source, from which a D2D synchronization signal is not transmitted, is synchronized with the D2D synchronization source. The eNB 200 that is a D2D synchronization source transmits, by a broadcast signal, D2D resource information indicating radio resources (resource pool) available for the D2D proximity service. The D2D resource information includes information indicating a resource pool for the discovery procedure (Discovery resource information) and information indicating a resource pool for the D2D communication (Communication resource information), for example. The UE 100 that is a D2D non-synchronization source performs the discovery procedure and the D2D communication on the basis of the D2D resource information received from the eNB 200.

In "Out of coverage" or "Partial coverage", the UE 100 is a D2D synchronization source. In "Out of coverage", the UE 100 that is a D2D synchronization source transmits D2D resource information indicating radio resources (resource pool) available for the D2D proximity service, by a D2D synchronization signal, for example. The D2D synchronization signal is a signal transmitted in the synchronization procedure in which a device-to-device synchronization is established. The D2D synchronization signal includes a D2D SS and a physical D2D synchronization channel (PD2DSCH). The D2D SS is a signal for providing a synchronization standard of a time and a frequency. The PD2DSCH is a physical channel through which a greater amount of information can be conveyed than the D2D SS can. The PD2DSCH conveys the above-described D2D resource information (the Discovery resource information and the Communication resource information). Alternatively, when the D2D SS is associated with the D2D resource information, the PD2DSCH may be rendered unnecessary.

The discovery procedure is used mainly when the D2D communication is performed by unicast. When starting the D2D communication with another UE 100, one UE 100 uses any particular radio resource in the resource pool for the discovery procedure to transmit the Discovery signal. When starting the D2D communication with the one UE 100, the other UE 100 scans the Discovery signal within the resource pool for the discovery procedure to receive the Discovery signal. The Discovery signal may include information indicating radio resources used by the one UE 100 for the D2D communication.

Further, a discovery procedure in which a user terminal that exists in a certain cell (serving cell) discovers a proximal terminal that exists in another cell (neighbor cell) is called an inter-cell discovery procedure (Inter-Cell Discovery). Further, D2D communication in which a user terminal that exists in a serving cell performs communication with a proximal terminal that exists in a neighbor cell is called inter-cell D2D communication (Inter-Cell Communication).

(3) Operation Environment

Figure 6:
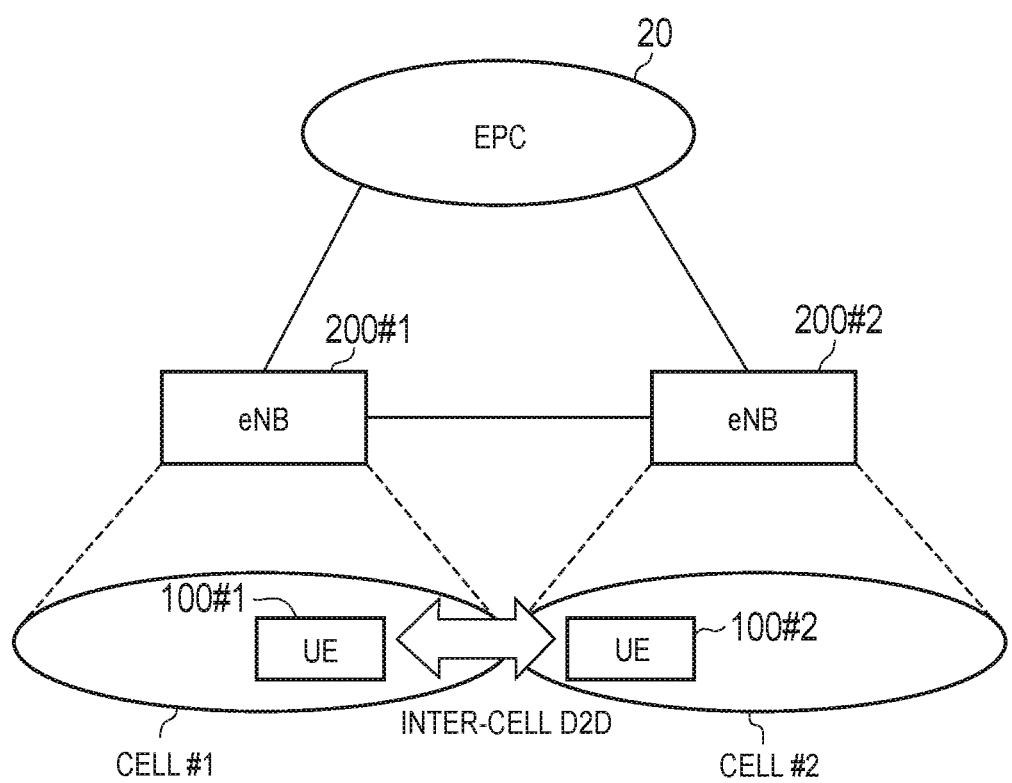
FIG. 6 is a diagram illustrating an operation environment according to the first embodiment.

An operation environment according to the first embodiment will be described, below. FIG. 6 is a diagram illustrating an operation environment according to the first embodiment.

As illustrated in FIG. 6, an eNB 200#1 forms a cell #1, and an eNB 200#2 forms a cell #2. The cell #1 and the cell #2 are in a relationship where the both are adjacent to each other.

The UE 100#1 exists in the cell #1. The UE 100#1 is in a RRC connected state or a RRC idle state in the cell #1. When the UE 100#1 is concerned, the cell #1 is a serving cell and the cell #2 is a neighbor cell.

The UE 100#2 exists in the cell #2. The UE 100#2 is in a RRC connected state or a RRC idle state in the cell #2. When the UE 100#2 is concerned, the cell #1 is a neighbor cell and the cell #2 is a serving cell.

In the first embodiment, in such an operation environment, a scenario is assumed where the UE 100#1 performs the Inter-Cell Discovery with the UE 100#2. Further, a scenario is assumed where the cell #2 is not synchronized with the cell #1. When the cell #2 is not synchronized with the cell #1, the UE 100#1 is non-synchronized with the UE 100#2, and thus, it is highly probable that the Inter-Cell Discovery with the UE 100#2 is failed even when the UE 100#1 tries.

(4) Operation According to First Embodiment

An operation according to the first embodiment will be described, below.

(4.1) Operation Overview

Figure 7:
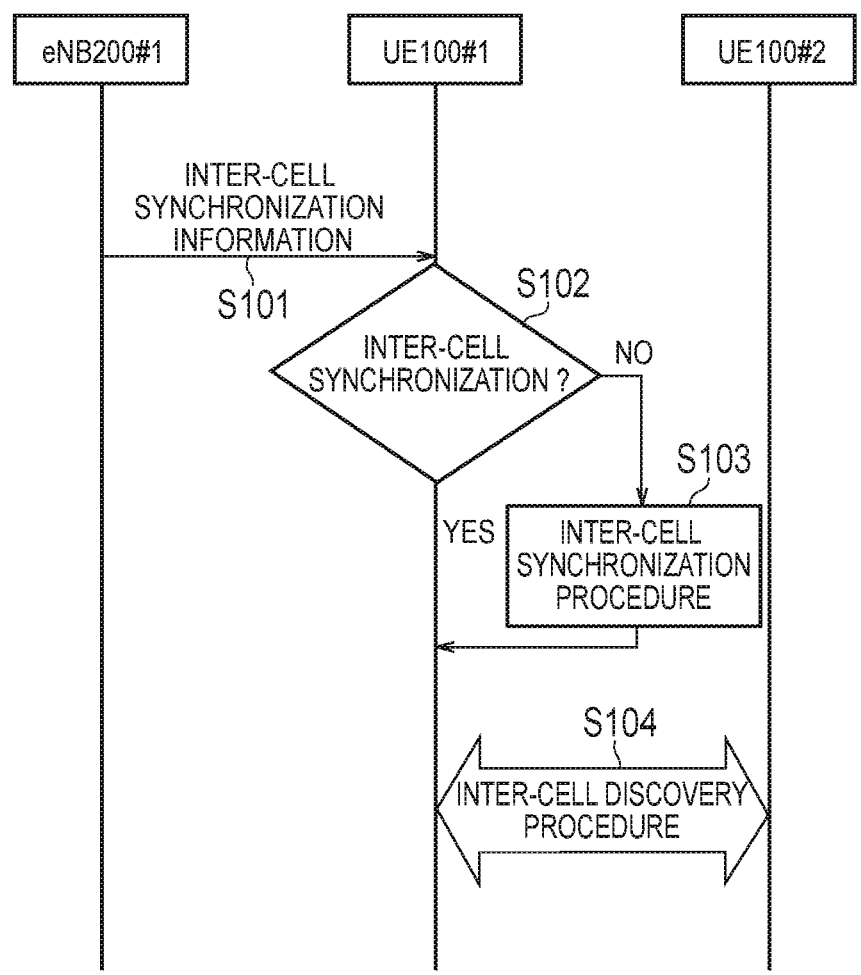
FIG. 7 is a sequence diagram illustrating an operation according to the first embodiment.

FIG. 7 is a sequence diagram illustrating an operation according to the first embodiment.

As illustrated in FIG. 7, in step S101, the eNB 200#1 transmits the inter-cell synchronization information on whether the cell #2 (neighbor cell) is synchronized with the cell #1 (serving cell). The UE 100#1 receives the inter-cell synchronization information from the eNB 200#1.

The inter-cell synchronization information is transmitted by a broadcast signal. Alternatively, the inter-cell synchronization information may be transmitted by a unicast signal. The inter-cell synchronization information preferably includes an identifier of the cell #2. The inter-cell synchronization information may be included in the same message as the D2D resource information.

In step S102, the UE 100#1 determines, on the basis of the inter-cell synchronization information, whether to perform an inter-cell synchronization procedure (Inter-Cell Synchronization) to establish the synchronization with the UE 100#2 (proximal terminal). Specifically, the UE 100#1 determines that the Inter-Cell Synchronization is unnecessary when the cell #2 is synchronized with the cell #1. On the other hand, the UE 100#1 determines that the Inter-Cell Synchronization is performed when the cell #2 is not synchronized with the cell #1.

When the cell #2 is not synchronized with the cell #1 (step S102: NO), the Inter-Cell Synchronization is performed in step S103. There are two patterns for the Inter-Cell Synchronization. Each operation pattern will be described in detail later.

In step S104, the UE 100#1 performs the Inter-Cell Discovery with the UE 100#2.

Thus, the UE 100#1 receives the inter-cell synchronization information from the eNB 200#1 forming the cell #1 (serving cell). The UE 100#1 determines whether to perform the Inter-Cell Synchronization for establishing the synchronization with the UE 100#2 on the basis of the inter-cell synchronization information, before performing the Inter-Cell Discovery with the UE 100#2 (proximal terminal) that exists in the cell #2 (neighbor cell).

Thus, the UE 100#1 is capable of performing the Inter-Cell Synchronization after confirming that the cell #2 is not synchronized with the cell #1. Therefore, it is possible to appropriately perform the Inter-Cell Discovery after establishing the synchronization with the UE 100#2.

On the other hand, when the cell #2 is synchronized with the cell #1, the UE 100#1 is capable of omitting the Inter-Cell Synchronization. Therefore, it is possible to restrain an increase in process load, interference, etc., caused as a result of performing an unnecessary Inter-Cell Synchronization.

(4.2) Operation Pattern 1

Next, an operation pattern 1 of the Inter-Cell Synchronization will be described.

In the operation pattern 1, in the Inter-Cell Synchronization, the UE 100#1 transmits a D2D SS (D2D synchronization signal). The UE 100#2 that receives the D2D SS is capable of being synchronized with the UE 100#1. Thus, the synchronization between the UE 100#1 and the UE 100#2 is established.

The UE 100#2 that receives the D2D SS is capable of being synchronized with the UE 100#1. Thus, the synchronization between the UE 100#1 and the UE 100#2 is directly established.

Alternatively, in the Inter-Cell Synchronization, the UE 100#1 may scan the D2D SS transmitted from the UE 100#2. As a result of the scan, the UE 100#1 may start transmitting the D2D SS when the D2D SS transmitted from the UE 100#2 is not detected. Note that it is assumed that the D2D SS includes information indicating a serving cell of a UE from which the D2D SS is transmitted.

As described above, the D2D SS is used in a case of the Out of coverage or the Partial coverage; however, in the first embodiment, the D2D SS is exchanged in a case of the In coverage.

In the operation pattern 1, the inter-cell synchronization information transmitted from the eNB 200#1 may include a 1-bit flag indicating whether the cell #2 is synchronized with the cell #1. In the inter-cell synchronization information, the flag is associated with the identifier of the cell #2.

The UE 100#1 starts transmitting (or scanning) the D2D SS, determining that the Inter-Cell Synchronization is performed, when the flag indicates that the cell #2 is not synchronized with the cell #1.

(4.3) Operation Pattern 2

Next, an operation pattern 2 of the Inter-Cell Synchronization will be described.

In the operation pattern 2, the inter-cell synchronization information transmitted from the eNB 200#1 is information indicating a synchronization deviation amount between the cell #1 (serving cell) and the cell #2 (neighbor cell). The information indicating the synchronization deviation amount includes a radio frame offset value of the cell #2 relative to the cell #1, a subframe offset value of the cell #2 relative to the cell #1, etc.

In the operation pattern 2, the eNB 200#1 may transmit the inter-cell synchronization information on the cell #2, only when the cell #2 is not synchronized with the cell #1. That is, then eNB 200#1 may not transmit the inter-cell synchronization information on the cell #2, when the cell #2 is synchronized with the cell #1. In this case, the UE 100#1 determines that the Inter-Cell Synchronization is performed when receiving the inter-cell synchronization information on the cell #2 from the eNB 200#1.

Alternatively, the eNB 200#1 may transmit the inter-cell synchronization information on the cell #2 also when the cell #2 is synchronized with the cell #1. In this case, the offset value indicating the synchronization deviation amount is set to zero. In this case, the UE 100#1 determines that the Inter-Cell Synchronization is performed when receiving the inter-cell synchronization information including an offset value greater than zero.

In the operation pattern 2, in the Inter-Cell Synchronization, the UE 100#1 controls to be synchronized with the cell #2 in accordance with the synchronization deviation amount. For example, adjustment of a transmission timing of the Discovery signal and/or adjustment of a reception timing of the Discovery signal are performed. As a result of the UE 100#1 controlling to be synchronized with the cell #2 in accordance with the synchronization deviation amount, synchronization between the UE 100#1 and the UE 100#2 is established.

[Second Embodiment]

A difference of the second embodiment from the first embodiment will be mainly described. In the second embodiment, a case is assumed where the operation pattern 1 of the above-described Inter-Cell Synchronization is applied.

In the operation pattern 1 of the above-described Inter-Cell Synchronization, each UE 100 that performs the Inter-Cell Synchronization exchanges the D2D SS in "In coverage", and thus, it may be possible that interference increase resulting from the D2D SS. Thus, in the second embodiment, in the operation pattern 1 of the above-described Inter-Cell Synchronization, an increase in interference is restrained by restraining the transmission of the D2D SS.

(1) Operation Environment

Figure 8:
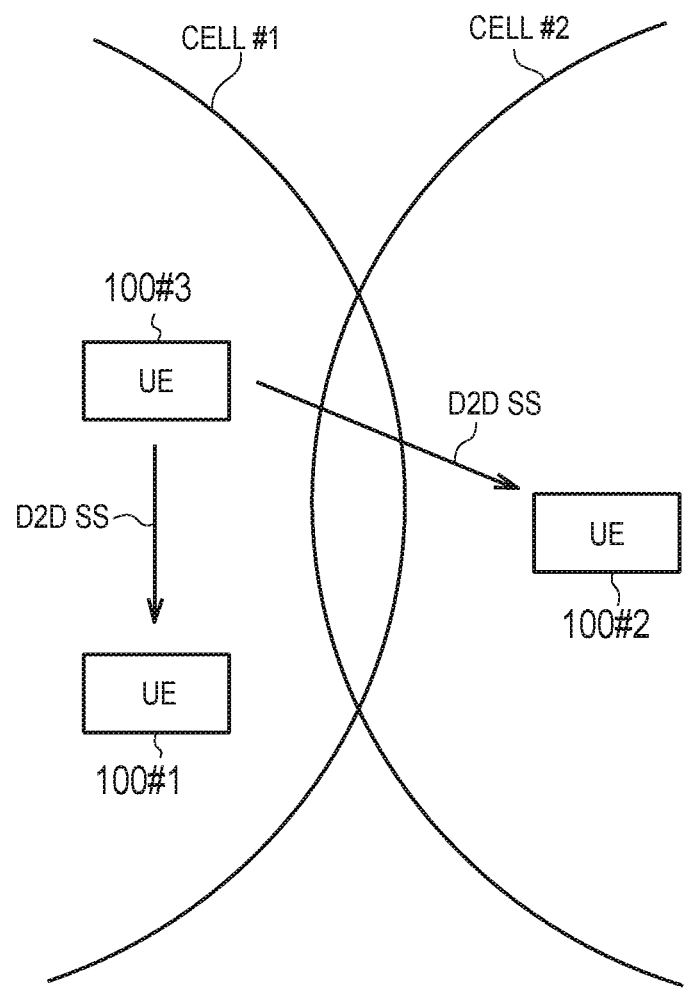
FIG. 8 is a diagram illustrating an operation environment according to the second embodiment.

An operation environment according to the second embodiment will be described, below. FIG. 8 is a diagram illustrating the operation environment according to the second embodiment.

As illustrated in FIG. 8, the UE 100#1 and the UE 100#3 exist in a coverage of the cell #1. Further, the UE 100#2 exists in a coverage of the cell #2. Each of the UE 100#1 to the UE 100#3 is a UE 100 that performs the Inter-Cell Synchronization to perform the Inter-Cell Discovery.

The UE 100#3 is located near the UE 100#1 and transmits a D2D SS. As described above, the D2D SS includes information indicating a serving cell of the transmission source.

Each of the UE 100-1 and the UE 100-2 receives the D2D SS from the UE 100#3. The UE 100#2 establishes the synchronization with the UE 100#3 by using the D2D SS in response to reception of the D2D SS from the UE 100#3 on the neighbor cell.

Here, the UE 100#1 and the UE 100#3 that exist in the identical cell are synchronized with each other, and thus, this means that the UE 100#2 establishes the synchronization with the UE 100#1 simultaneously of establishing the synchronization with the UE 100#3. Thus, the UE 100#1 does not need to transmit the D2D SS.

(2) Operation According the Second Embodiment

An operation according to the second embodiment will be described, below.

The UE 100#1 according to the second embodiment scans the D2D SS transmitted from the UE 100#3 (another UE) that exists in the cell #1 (serving cell), before performing the Inter-Cell Discovery with the UE 100#2 (proximal terminal) that exists in the cell #2 (neighbor cell).

Then, the UE 100#1 cancels transmission of the D2D SS from the UE 100#1 on the basis of detection of the D2D SS transmitted from the UE 100#3 that exists in the cell #1. Here, when the UE 100#1 detects the D2D SS transmitted from the UE 100#3 that exists in the cell #1 and a reception level of the detected D2D SS exceeds a threshold value, the UE 100#1 preferably cancels transmission of the D2D SS from the UE 100#1.

Figure 9:
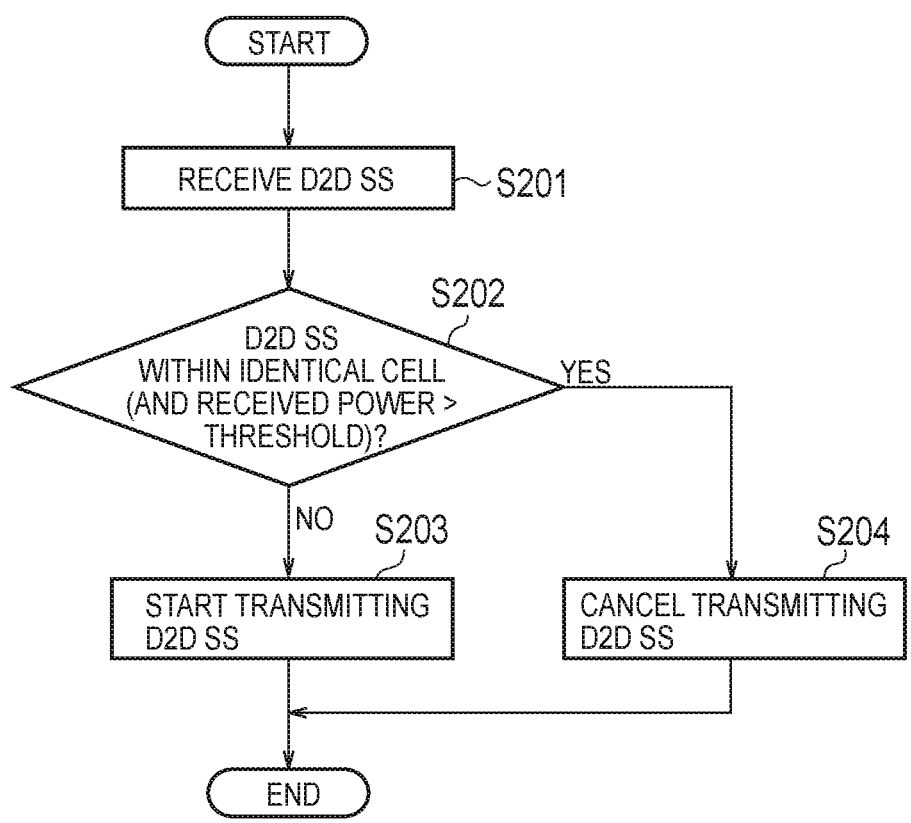
FIG. 9 is a flowchart illustrating an operation of the UE according to the second embodiment.

FIG. 9 is a flowchart illustrating an operation of the UE 100#1 according to the second embodiment. For example, the UE 100#1 starts the present flow when determining that the Inter-Cell Discovery is performed.

As illustrated in FIG. 9, in step S201, the UE 100#1 scans the D2D SS to measure the reception level of the received D2D SS.

In step S202, the UE 100#1 determines whether the serving cell identifier included in the D2D SS matches the cell identifier of the cell #1. When matching, the UE 100#1 determines whether the reception level of the D2D SS exceeds a threshold value.

When "NO" in step S202, in step S203, the UE 100#1 starts (or continues) transmitting the D2D SS. On the other hand, when "YES" in step S202, in step S204, the UE 100#1 cancels transmitting the D2D SS.

Thus, in the inter-Cell Synchronization, the UE 100#1 that exists in the cell #1 cancels transmitting the D2D SS from the UE 100#1 on the basis of detection of the D2D SS transmitted from the other UE that exists in the cell #1. Thus, it is possible to restrain transmission of the D2D SS.

[Modification of Second Embodiment]

In the above-described second embodiment, the UE takes the initiative to control the transmission of the D2D SS. However, the eNB may take the initiative to control the transmission of the D2D SS. In a modification of the second embodiment, a case is assumed where it is not possible to transmit the D2D SS if it is not possible to obtain permission from the eNB 200. However, a basic concept is similar to that of the second embodiment.

An operation according to the modification of the second embodiment will be described, below. Here, an operation in an operation environment as illustrated in FIG. 8 will be described.

Figure 10:
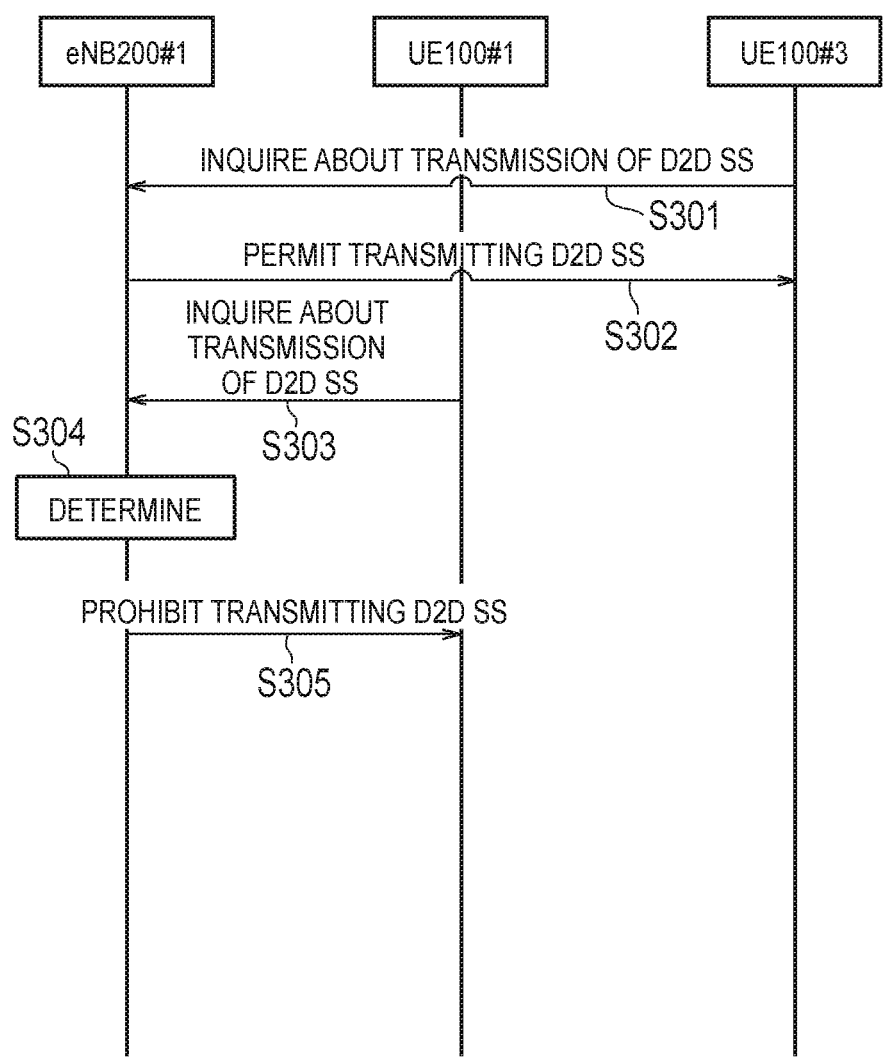
FIG. 10 is a sequence diagram illustrating an operation according to a modification of the second embodiment.

FIG. 10 is a sequence diagram illustrating an operation according to the modification of the second embodiment. In FIG. 10, the UE 100#1 and the UE 100#3 exist in the cell #1 formed by the eNB 200#1.

As illustrated in FIG. 10, in step S301, the UE 100#3 transmits, to the eNB 200#1, an inquiry as to whether it is possible to transmit the D2D SS. The inquiry may include geological location information of the UE 100#3. The eNB 200#1 determines whether to permit transmission of the D2D SS, on the inquiry from the UE 100#3. Here, description proceeds with an assumption where permission of the transmission of the D2D SS is given to the UE 100#3. The eNB 200#1 stores information on the UE 100#3 in which the transmission of the D2D SS is permitted.

In step S302, the eNB 200#1 notifies the UE 100#3 of transmission permission of the D2D SS. The UE 100#3 starts transmitting the D2D SS once the transmission of the D2D SS is permitted.

In step S303, the UE 100#1 transmits, to the eNB 200#1, an inquiry as to whether it is possible to transmit the D2D SS. The inquiry may include geological location information on the UE 100#1.

In step S304, the eNB 200#1 determines whether to permit transmission of the D2D SS, on the inquiry from the UE 100#1. The eNB 200#1 already permits the UE 100#3 to transmit the D2D SS, that is, the UE 100#3 is transmitting the D2D SS, and thus, the eNB 200#1 may determine that the transmission by the UE 100#1 of the D2D SS is not permitted.

Alternatively, when the permission of the transmission of the D2D SS is already given to the UE 100#3 and it is estimated that there is the UE 100#3 near the UE 100#1, the eNB 200#1 may determine that the transmission, by the UE 100#1, of the D2D SS is not permitted. In this case, the eNB 200#1 may determine on the basis of the geological location information included in the inquiry whether there is the UE 100#3 near the UE 100#1. Alternatively, when the eNB 200#1 manages a pathloss value of each UE 100, an uplink transmission power value, or a timing advance (TA) value, the eNB 200#1 may make a determination on the basis of the pathloss value, the uplink transmission power value, or the TA value, instead of the geological location information.

Here, description proceeds with an assumption where permission of transmission of the D2D SS is not given to the UE 100#1.

In step S305, the eNB 200#1 notifies the UE 100#1 of prohibition of transmission (denial) of the D2D SS. The UE 100#1 does not start transmitting the D2D SS because the transmission of the D2D SS is not permitted.

Thus, according to the modification of the second embodiment, similarly to the above-described second embodiment, it is possible to restrain transmission of the D2D SS.

It is noted that in the modification of the second embodiment, in order to manage a transmission status of the D2D SS by the eNB 200#1, it is preferable that the UE 100 that stops transmitting the D2D SS inquires or notifies the eNB 200#1 to that effect.

[Other Embodiments]

In above-described each embodiment, a scenario is assumed where the UE 100#1 performs the Inter-Cell Discovery with the UE 100#2. However, the present disclosure may be also applied to a scenario where the UE 100#1 performs the Inter-Cell Communication with the UE 100#2 while the UE 100#1 does not perform the Inter-Cell Discovery with the UE 100#2. That is, the "Inter-Cell Discovery" in the operation according to above-described each embodiment can be replaced by the "Inter-Cell Communication".

Furthermore, in the embodiment described above, although an LTE system is described as an example of a mobile communication system, the present disclosure is not limited to the LTE system, and may be applied to a system other than the LTE system.

[Additional Statements]

Below, supplementary notes of the embodiments will be noted.

(Introduction)

As for the inter-cell discovery, a following agreement on D2D reception discovery resource pools is made.

The eNB may provide D2D reception discovery resources in SIB. These may cover resources used for D2D transmission in this cell as well as resources used in neighbour cells. (Details FFS)

On the other hand, RAN1 made a following agreement.

Confirm that a radio resource pool(s) may be provided by eNB for D2D UEs in SIB for discovery reception for Type-2B (if supported). FFS whether the common reception pool(s) or different reception pools for type 1 and Type-2B discovery. UE is not required to decode neighbor cell SIB.

Mechanisms for Type-2B discovery. A resource hopping mechanism following the resource allocation by eNB can be applied. FFS details of resource hopping mechanism.

In this additional statements, we will investigate other aspects of inter-cell discovery and propose possible solutions, based on the above agreements.

(Discussion)

Regarding the synchronization among serving cell and neighbouring cells, the following 2 deployments have been considered until last RAN2 meeting.

Synchronous Deployment

For synchronous deployment, serving cell is synchronized with neighbouring cells, so that D2D UEs can perform inter-cell discovery transmission/reception by referring the synchronization signal transmitted from serving cell. Therefore, serving cell is not required to transmit additional information other than reception resource pools. Synchronous deployment can be achieved by OAM and eNB implementation. For example, synchronous deployments may be assumed within each MBSFN area.

Asynchronous Deployment

For the asynchronous deployment, serving cell is not synchronized with neighbouring cells, so that D2D UE in serving cell is required to be synchronized with D2D UE in neighbouring cell before performing inter-cell discovery transmission/reception.

As for the inter-cell discovery, both types of deployment are assumed, therefore, inter-cell discovery should also be considered for both types of deployment. For reducing the complexity, it is considered that common scheme to perform inter-cell discovery should be introduced for both synchronous and asynchronous deployment. It is assumed the scheme can be classified based on whether or not D2D UEs perform direct synchronization with other D2D UEs for inter-cell discovery.

(Direct Synchronization with Other D2D UEs: Alt.1)

With direct synchronization, the in-coverage D2D UE transmits D2DSS or receives D2DSS transmitted by D2D UE in the neighbouring cell before performing inter-cell discovery in order to be synchronized with D2D UE in the neighbouring cell. Since this scheme assumes direct synchronization with other D2D UEs, it does not matter whether or not the neighbouring cell is synchronized with the serving cell; therefore, this scheme is applicable for both synchronous and asynchronous deployments.

To achieve direct synchronization efficiently, in-coverage D2D UE transmits D2DSS before transmitting discovery signal to D2DUE in neighbouring cell. Similarly, in-coverage D2D UE monitors D2DSS transmitted by D2D UE in neighbouring cell before receiving discovery signal from D2D UE in neighbouring cell. One of the drawbacks of this scheme is the increased interference among D2DSS transmissions within NW coverage. Therefore, further enhancement is needed to minimize the number of D2D UEs transmitting D2DSS for inter-cell discovery.

(Non-Direct Synchronization with Other D2D UEs: Alt.2)

With this scheme, the serving cell should inform the in-coverage D2D UE of the neighbouring cell's timing in order to perform inter-cell discovery on the asynchronous deployment, so that the in-coverage D2D UE can perform inter-cell discovery transmission/reception without transmitting/receiving D2DSS irrespective of whether or not the neighbouring cell is synchronized with the serving cell. It is assumed that neighbouring cell's timing can be provided to the serving cell by OAM as well as neighbouring cell's reception resource pools. Therefore, serving cell should provide this timing information to D2D UEs as well as neighbour cells' reception resource pools.

Based on the descriptions of both alternatives above, RAN2 should consider which alternative should be adopted for inter-cell D2D discovery.

Proposal 1: RAN2 should discuss which alternative should be adopted for inter-cell D2D discovery.

Proposal 2: If Alt.2 is agreed, the serving cell should provide timing information as well as reception resource pools.

Clearly, other modifications and manners of practicing this disclosure will occur readily to those of ordinary skill in the art in view of these teachings. The above description is illustrative and not restrictive. This disclosure is to be limited only by the following claims, which include all such modifications and manners of practice when viewed in conjunction with the above specification and accompanying drawings. The scope of the disclosure should, therefore, be determined not with reference to the above description, but instead should be determined with reference to the appended claims along with their full scope of equivalents.

INDUSTRIAL APPLICABILITY

The present disclosure is useful for communication fields.

The invention claimed is:

1. A first user terminal, comprising:
a processor and a memory storing instructions executable by the processor to execute processes of:
transmitting, from the first user terminal, first device-to-device (D2D) synchronization information including an identifier;
receiving second D2D synchronization information transmitted from a second user terminal;
measuring a received signal power corresponding to the second user terminal;
determining, based on information included in the second D2D synchronization information, whether the second user terminal is in coverage of a predetermined cell;
synchronizing with the second user terminal in response to the received signal power exceeding a predetermined power value and the second user terminal being in the coverage; and
stopping transmission of the first D2D synchronization information including the identifier in response to the received signal power exceeding the predetermined power value and the second user terminal being in the coverage.

2. A device equipped in a first user terminal, comprising:
a processor and a memory storing instructions executable by the processor to execute processes of:
transmitting, from the first user terminal, first device-to-device (D2D) synchronization information including an identifier;
receiving second D2D synchronization information transmitted from a second user terminal;
measuring a received signal power corresponding to the second user terminal;
determining, based on information included in the second D2D synchronization information, whether the second user terminal is in coverage of a predetermined cell;
synchronizing with the second user terminal in response to the received signal power exceeding a predetermined power value and the second user terminal being in the coverage; and
stopping transmission of the first D2D synchronization information including the identifier in response to the received signal power exceeding the predetermined power value and the second user terminal being in the coverage.

3. A method performed at a first user terminal, comprising:
transmitting, from the first user terminal, first device-to-device (D2D) synchronization information including an identifier;
receiving second D2D synchronization information transmitted from a second user terminal;
measuring a received signal power corresponding to the second user terminal;
determining, based on information included in the second D2D synchronization information, whether the second user terminal is in coverage of a predetermined cell; and
synchronizing with the second user terminal in response to the received signal power exceeding a predetermined power value and the second user terminal being in the coverage; and
stopping transmission of the first D2D synchronization information including the identifier in response to the received signal power exceeding the predetermined power value and the second user terminal being in the coverage.

* * * * *